United States Patent
Cannon et al.

[19]

[11] Patent Number: 6,154,729
[45] Date of Patent: *Nov. 28, 2000

[54] METHOD OF REPORTING MERCHANT INFORMATION TO BANKS

[75] Inventors: Jonathan Michael Cannon, Dover, Pa.; David Neumyer, Baltimore, Md.

[73] Assignee: First Data Corporation, Hackensack, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/099,734

[22] Filed: Jun. 19, 1998

[51] Int. Cl.$^7$ ...................................................... G06F 17/60
[52] U.S. Cl. .................................. 705/35; 705/1; 705/38
[58] Field of Search .................................. 705/35, 34, 1, 705/26, 30, 38; 709/217, 218, 219

[56] References Cited

U.S. PATENT DOCUMENTS

| | | | |
|---|---|---|---|
| 4,017,837 | 4/1977 | Lasning et al. | 358/1.11 |
| 5,566,069 | 10/1996 | Clark, Jr. et al. | 702/2 |
| 5,870,721 | 2/1999 | Norris | 705/38 |
| 5,930,764 | 7/1999 | Melchione et al. | 705/10 |
| 5,930,773 | 7/1999 | Crooks et al. | 705/30 |
| 5,930,776 | 7/1999 | Dykstra et al. | 705/38 |
| 6,035,285 | 3/2000 | Schlect et al. | 705/30 |

FOREIGN PATENT DOCUMENTS

WO 97/15023  4/1997  WIPO .

OTHER PUBLICATIONS

"Concentrex Selected as Charter Member of Sagent's Internert ASP Partner Program"; PR Newswire, Apr. 4, 2000, p. 8030.

"Sagent Provides Heller Financial With Solution to Create Unified, Accurate View of Its Customer Base"; Business Wire, Mar. 7, 2000; p. 0408.

"D&B Offers Internet Access To Global Business Information", Information Today, vol. 14, No. 9, Oct., 1997.

"New Information Services From LEXIS–NEXIS", Information Today, vol. 14, No. 1, Jan., 1997.

Beiswinger, George L., "Beyond Virus Protection", D&B Reports, vol. 42, No. 1, Jan./Feb. 1993.

*Primary Examiner*—Edward R. Cosimano
*Attorney, Agent, or Firm*—Brooks & Kushman P.C.

[57] ABSTRACT

A method of reporting merchant information to banks via the World Wide Web includes compiling merchant information periodically into reports. The reports correspond to categories. The reports are then routed to a server operable with the World Wide Web. The World Wide Web is then browsed with a browser interface to display a list of the categories on a bank client station. A desired category from the list of categories is then selected at the bank client station. A list of reports corresponding to the desired category is then displayed. A desired report from the list of reports is then selected. The desired report is then displayed.

1 Claim, 10 Drawing Sheets

```
          (Bank) Merchant Monthly Retrieval Activity Report
                    Merchant Name:   First Arcadian
                    Merchant #:      999000123999

Total Request Past 12 months:
   June  July  Aug  Sept  Oct  Nov  Dec  Jan  Feb  March  April  May
    50    51   49    50   50   51   49   61   58    49     47    50
Total Requests Fulfilled in Past 12 Months:
   June  July  Aug  Sept  Oct  Nov  Dec  Jan  Feb  March  April  May
    45    48   46    47   29   48   31   52   54    42     41    32
Total Requests Fulfilled Less Than 30 Days in Past 12 Months:
   June  July  Aug  Sept  Oct  Nov  Dec  Jan  Feb  March  April  May
    41    42   44    45   27   55   44   48   51    39     28    26
Percentage Fulfilled in Less Than 30 Days:
   June  July  Aug  Sept  Oct  Nov  Dec  Jan  Feb  March  April  May

| | Reports New Accounts |
|---|---|
| 142 | |
| 144 | Additional Outlet All Sources |
| 146 | Additional Outlet Request Aging |
| 148 | Additional Outlets Summary |
| 150 | Additional Outlets Declined |
| 152 | Additional Outlets Rejected |
| 154 | CTMF Reports |
| 156 | Daily Activity Report |
| 158 | Daily Credit Activity |
| 160 | Daily Deployment Activity |
| 162 | Daily QC and Keying Activity |
| 164 | Merchant With Hold indicator |
| 166 | New Account Summary |
| 168 | New Client All Sources MIS |
| 170 | New Client Requests in Progress |
| 172 | New Clients Requests Aging |
| 174 | New Clients Requests Approved |
| 176 | New Clients Requests Declined |
| | New Client Requests Rejected |

| | Reports POS Deployment |
|---|---|
| 182 | |
| 184 | Customer Owned MIS |
| 186 | Daily Account Maintenance |
| 188 | Daily Completed Work |
| 190 | Daily Customer Owned Requests |
| 192 | Daily Equipment Requests |
| 194 | Daily Replacement Requests |
| 196 | Daily Total Requests |
| 198 | Daily Work In Progress |
| | Training MIS |

| | | | | | | | | | | |
|---|---|---|---|---|---|---|---|---|---|---|
| 2 | | 3 | 4 | 5 | 6 | 7 | 8 | 9 | 10 | 11 |
| Merchant Name | | Merchant Number | Date Received in Credit | Date Declined | Date Rejected | Reject Reason Code | Rej To AP/AU/ Sales | Date Submit to Credit | Date Approved | FDMS Rec'd Date |
| Pastels in Paradise | | 999000123999 | | | | | | | 12/08/98 | |
| Voyager Car Wash | | 999000456998 | | 12/09/98 | | | | | | |
| Juniors Junque Shop | | 999000789997 | | | | | | | 12/12/98 | |
| Candace's Candies | | 999000912996 | | | 12/13/98 | | | | | |
| Atlantic Attic | | 999000345995 | | 12/09/98 | | | | | | |
| Lamonts Flower Shop | | 999000678994 | | | | | | | 12/09/98 | |
| Tai Pei Kitchen | | 999000901993 | | | 12/11/98 | | | | | |
| Joe Anthony's | | 999000234992 | | | | | | | 12/10/98 | |
| Jackson Auto Repairs | | 999000567991 | | | | | | | 12/13/98 | |
| Morrow's Tropical Treats | | 999000890990 | | | | | | | 12/13/98 | |
| Academy School of Music | | 999000987999 | | | | | | | 12/12/98 | |
| Le Sport Sac | | 999000654998 | | | | | | | 12/11/98 | |
| The Mad Hungarian | | 999000321996 | | 12/11/98 | | | | | | |

Daily Credit Activity Report
(Bank) New Account Tracking MIS – June 30, 1999

*Fig. 10*

Thursday, June 20, 1998 — Bank MIS - Work in Progress - Bank Name — Page 1 of 2

| 1 | 2 | 3 | 4 | 5 | 6 | 7 | 8 |
|---|---|---|---|---|---|---|---|
| Merchant # | DBA Name | Network | Request Type | Current Status | Pending Type | Business Days From Approval | Business Days In Pending |
| 999900012999 | Feber's Upholstery | MAPP | Replacement | Waiting Program | Third Party | 11 | 00 |
| 999900034998 | USU Alumni Gift Shop | VNET | Additional Equipment | Waiting Quality Control | Third Party | 25 | 25 |
| 999900056997 | Pistol Pete's, Inc. | S/88 | Replacement | Waiting Quality Control | | 28 | 00 |
| 999900078995 | Back to the Rack | S/88 | Customer Owned Peripherals | Waiting Program | | 49 | 00 |
| 999900090993 | Aladdin's Rugs | S/88 | New Account | Pending | | 49 | 00 |
| 999900012991 | Local Cleaners | MAPP | Additional Outlet | Waiting Shipment | Third Party | 82 | 00 |
| 999900034999 | Wilson's Computers | S/88 | New Outlet | Waiting Initial Review | | 119 | 119 |
| 999900056997 | Jewelry Mechanics | VNET | New Outlet | Waiting Program | Third Party | 140 | 105 |

| REPORT: | KFRA005D-01 | BUSINESS: TEXAS BUSINESS CHAIN LVL | WORK OF: 1998/10/24 3 |
|---|---|---|---|
| 2 DATE: | 1998/10/24 | 1 F D M S - DAILY TOP DEPOSITORS | TIME: 08:07:50 4 |
| | | | PAGE: 1 5 |

REPORT PARAMETERS: TOP DEPOSITOS = 20 AND DAILY SALES > 5000     BUSINESS: 023123456990
6 (NET SALES - ACTUAL 3 MONTH DAILY) .1000     BANK:
(NET SALES - ACTUAL 3 MONTH DAILY)/3 MONTH DAILY) .50     AGENT:

| 7 | 8 | 9 | 10 | 11 | 12 | 13 | 14 |
|---|---|---|---|---|---|---|---|
| MERCHANT # | MERCHANT NAME | INSTALL DATE | SIC CODE | NET SALES | ACTUAL MONTH DAILY AVG | PERCENT OVER DAILY AVERAGE | DAILY AVG TICKET |
| 999900000 | MIDWAY ARM#2 | 1994/07/14 | 5961 | 86,461 | 56,640 | 56,640 | 94 |
| 999905698 | DR D RASMUSSEN | 1985/11/22 | 8011 | 41,465 | 1,258 | 1,258 | 1,892 |
| 999200924 | LIFE OUTREACH CO | 1992/10/22 | 5961 | 23,212 | 8,770 | 8,770 | 55 |
| 999200924 | CAFE PINOT | 1995/01/30 | 5812 | 10,551 | 5,624 | 5,624 | 82 |
| 999900006 | G B HARB INC. | 1994/02/23 | 5621 | 10,542 | 830 | 830 | 554 |

Fig. 17 ial
METHOD OF REPORTING MERCHANT INFORMATION TO BANKS

TECHNICAL FIELD

The present invention relates generally to providing merchant information to banks via a world wide web (WWW) browser interface.

BACKGROUND ART

Banks provide financial services to their customers such as lending money. Banks need to know the financial condition of their customers prior to making loans to them to determine the credit risk associated with making the loans. Banks also need to know the financial needs of their customers to provide them with the proper services.

In the past, reports concerning the financial condition and needs of bank customers, such as merchants, were compiled and then printed and mailed to the banks. A problem with this approach includes the cost of producing and distributing the reports to the banks along with the timeliness of the information contained in the reports.

What is needed is a method of providing a graphical user interface of a merchant database to banks via the WWW.

SUMMARY OF THE INVENTION

Accordingly, it is an object of the present invention to provide a method of presenting mainframe generated reports visually in a non-terminal enviorment that allows multiple users to view and print the reports simultaneously rather than waiting for manually distributed hard copies of the reports.

In carrying out the above objects and other objects, the present invention provides a method of reporting merchant information to banks via the World Wide Web. The method includes compiling merchant information periodically into reports. The reports correspond to categories. The reports are then routed to a server operable with the World Wide Web. The World Wide Web is then browsed with a browser interface to display a list of the categories on a bank client station. A desired category is then selected from the list of categories at the bank client station. A list of reports corresponding to the desired category is then displayed on the bank client station. A desired report from the list of reports is then selected at the bank client station. The desired report is then on the displayed bank client station.

These and other features, aspects, and embodiments of the present invention will become better understood with regard to the following description, appended claims, and accompanying drawings.

BEST MODES FOR CARRYING OUT THE INVENTION

Figure 1:
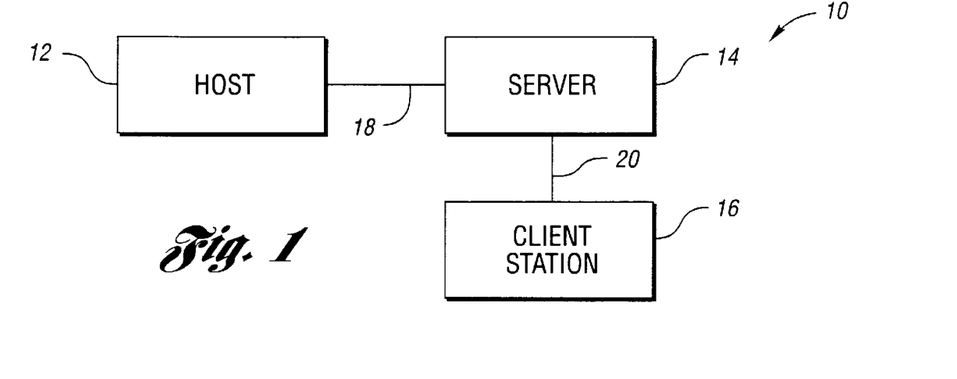
FIG. 1 illustrates a block diagram of a system for carrying out the method of the present invention.

Referring now to FIG. 1, a system 10 for carrying out the method of the present information is shown. System 10 includes a host 12, a server 14, and a client station 16. Host 12 compiles information regarding merchants into a plurality of different reports. The reports are compiled periodically such as every two hours. After a set of reports are compiled, preferably by software, host 12 routes them over an Ethernet connection 18 to server 14. Server 14 is operable with the world wide web (WWW). A user at client station 16 can then gain access to the reports from server 14 over a wide area network connection 20 via a WWW browser such as NETSCAPE NAVEIGATOR browser. The reports can be printed at client station 16 as hard copies.

Figure 2:
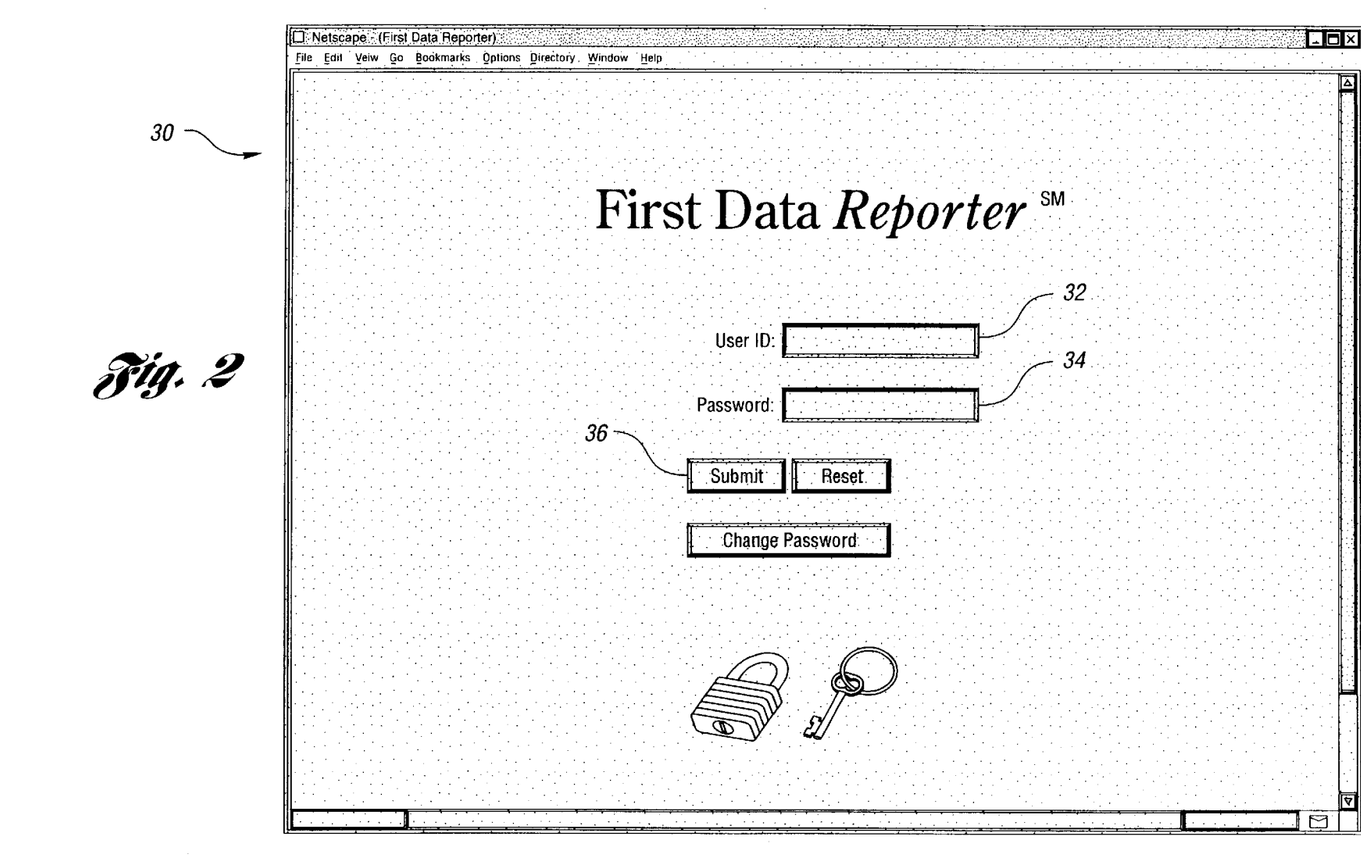
FIG. 2 illustates a WWW page displayed when the user begins the method of the present invention.

To access the reports, a user at client station 16 starts the WWW browser and enters a given uniform resource locator (URL) to obtain the WWW page 30 shown in FIG. 2. WWW page 30 includes a user ID input box 32 and a password input box 34. The user enters a user ID and a password and then clicks the submit button 36 to gain access to the reports.

Figure 3:
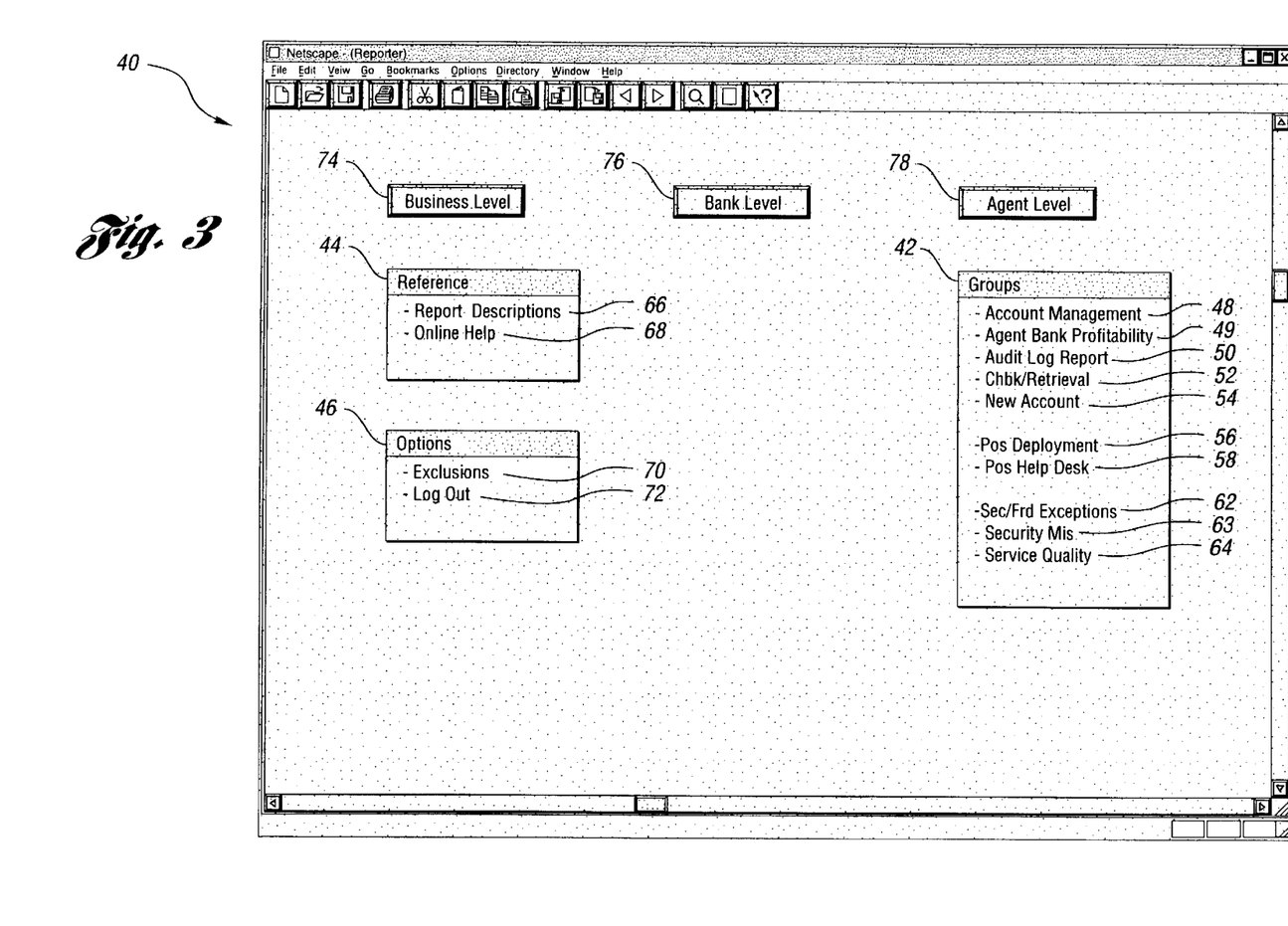
FIG. 3 illustrates a WWW page displayed when the user enters a successful user ID and password in the WWW page of FIG. 2.

If the entered user ID and password correspond to a valid user, WWW page 40 shown in FIG. 3 appears on client station 16. WWW page 40 includes a Groups header 42, a Reference header 44, and an Options header 46. Headers 42, 44, and 46 include a list of hyperlinks to another WWW page. Groups header 42 includes the following hyperlinks: Account Management 48, Agent Bank Profitability 49, Audit Log Report 50, Chargeback/Retrieval 52, New Accounts 54, Pos Deployment 56, Pos Help Desk 58, Security/Fraud Exceptions 62, Security Mis 63, and Service Quality 64. Reference header 44 includes the following hyperlinks: Report Descriptions 66 and Online Help 68. Options header 46 includes the following hyperlinks: Exclusions 70 and Log Out 72.

WWW page 40 further includes for display the following access levels: Business Level 74, Bank Level 76, and Agent Level 78. The access levels correspond to different levels of information that the user can access. The level of information available to the user is determined from the user ID. A user having the business level access has the highest level of access. A user having the agent level access has the lowest level of access.

The hyperlinks listed underneath Groups header 42 correspond to categories of reports regarding the finances of merchants. A user can gain access to these reports by clicking the hyperlink of the corresponding category. The user can also read descriptions of the reports by clicking report descriptions 66 hyperlink. The exclusions 70 hyperlink is used to exclude selected merchants from the reports.

Figure 4:
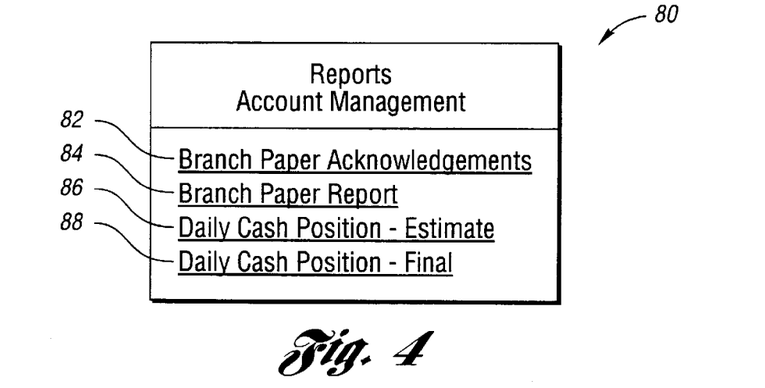
FIG. 4 illustrates an Account Management WWW page displayed when the user selects the account management hyperlink of the WWW page shown in FIG. 3.

Referring now to FIG. 4, a WWW page 80 is displayed on client station 16 when user clicks Account Management 48 hyperlink. WWW page 80 includes the following hyperlinks to reports corresponding to the account management category: Branch Paper Acknowledgments 82, Branch Paper Report 84, Daily Cash Position—Estimate 86, and a Daily Cash Position—Final 88. The user can view any of there reports by clicking the appropriate hyperlink. Some reports may contain different date and time versions.

The branch paper acknowledgments and the branch paper report include branch paper acknowledgments. The daily cash position—estimate and the daily cash position—final reports provide summary information of cash in (interchange settlement) and cash out (funding to merchants).

Figure 5:
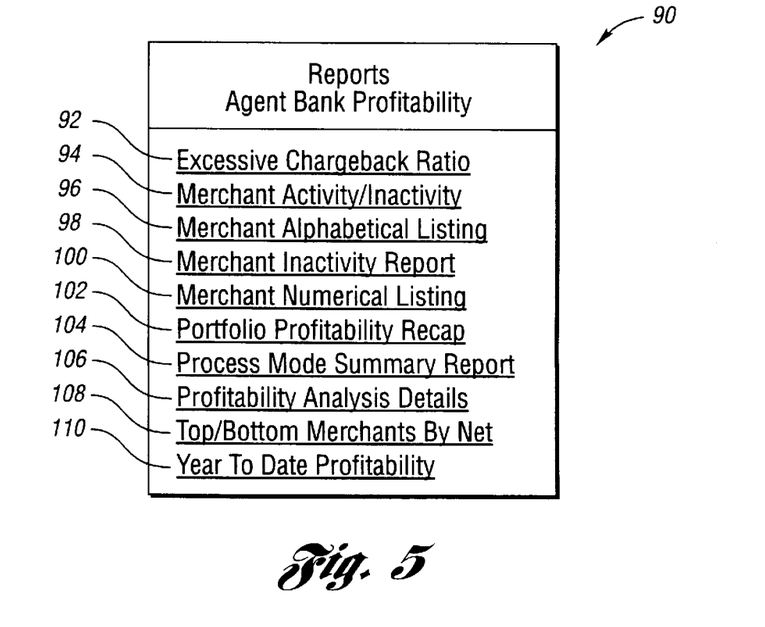
FIG. 5 illustrates an Agent Bank Profitability WWW page displayed when the user selects the agent bank profitability hyperlink of the WWW page show n in FIG. 3.

Referring now to FIG. 5, a WWW page 90 is displayed on client station 16 when user clicks Agent Bank Profitability 49 hyperlink. WWW page 90 includes the following hyperlinks to reports corresponding to the agent bank profitability category: Excessive Chargeback Ratio 92, Merchant Activity/Inactivity 94, Merchant Alphabetical Listing 96, Merchant Inactivity Report 98, Merchant Numerical Listing 100, Portfolio Profitability Recap 102, Process Mode Summary Report 104, Profitability Analysis Details 106, Top/Bottom Merchants By Net Income 108, Year to Date Profitability 110.

The excessive chargeback ratio report lists all merchants with an excessive ratio of chargebacks to transactions that exceeds the ratio specified by the user. A chargeback is a transaction that has been challenged by a cardholder and returned through interchange to the acquiring bank by a card holder issuing bank. This report enables the user to individually address merchants with excessive chargebacks. The merchant activity/inactivity report provides a summary of the merchant portfolio activity on a monthly and year to date basis including the user's total merchant base including active merchants and canceled merchants.

The merchant alphabetical listing report provides a listing of the user's merchants in alphabetical order including merchant numbers and addresses. This report allows the user to locate and cross reference information about any account. The merchant inactivity report provides a list of all accounts that have been inactive from 10 to 180 days. This report lists the first and last day of activity as well as the last twelve months of financial activity. This report highlights those merchants that are not performing up to the standards of the user.

The merchant numerical listing report provides a list of all the merchants of the user in numerical order. It contains the same information as the alphabetical listing report. The portfolio profitability recap report summarizes the user's profit on a month to date and year to date basis by three categories: discount income, fee income, and cash advance income. Also included in this report is the basis spread of the user's portfolio allowing for portfolio profitability tracking on a monthly basis.

The process mode summary report lists all merchants by product type, detailing all sales activity within the last twelve months. The profitability analysis details report provides a listing of all financial activity incurred by each merchant at an outlet level within the user's portfolio. Each outlet's income and fee figures are netted against the user's wholesale rate. The difference calculates as the user's profit. Each outlet's activity can be rolled up and displayed at the chain level. The user's portfolio is broken out by the user's bank branches.

The top merchants by sales volume report enables the user to sort through the user's merchant portfolio by sales volume according to a predetermined number selected by the user. This report also enables the user to sort through the user's merchant portfolio by the top merchants sale volumes. The top/bottom merchants by net income report lists the user's top and bottom merchants based on the user's monthly or year to date net income and includes basis point spreads for each listed account. The year to date profitability analysis details report provides the same information as the profitability analysis details except it shows year to date amounts.

Figure 6:
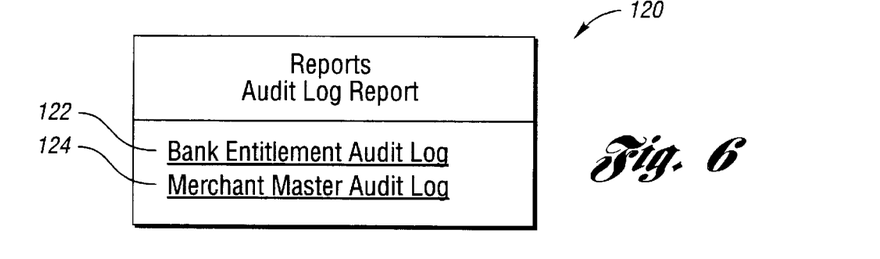
FIG. 6 illustrates an Audit Log Report WWW page displayed when the user selects the audit log report hyperlink of the WWW page shown in FIG. 3.

Referring now to FIG. 6, a WWW page 120 is displayed on client station 16 when user clicks Audit Log Report 50 hyperlink. WWW page 120 includes the following hyperlinks to reports corresponding to the audit log category: Bank Entitlement Audit Log 122 and Merchant Master Audit Log 124.

Figure 7:
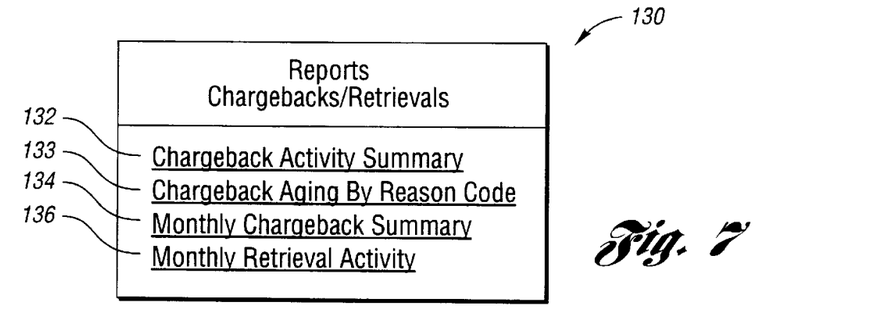
FIG. 7 illustrates a Chargebacks/Retrievals WWW page displayed when the user selects the chargebacks/retrievals hyperlink of the WWW page shown in FIG. 3.

Referring now to FIG. 7, a WWW page 130 is displayed on client station 16 when user clicks Chargebacks/Retrieval 52 hyperlink. WWW page 130 includes the following hyperlinks to reports corresponding to the chargebacks/retrieval category: Chargeback Activity Summary 132, Chargeback Aging By Reason Code 133, Monthly Chargeback Summary 134, and Monthly Retrieval Activity 136.

Figure 8:
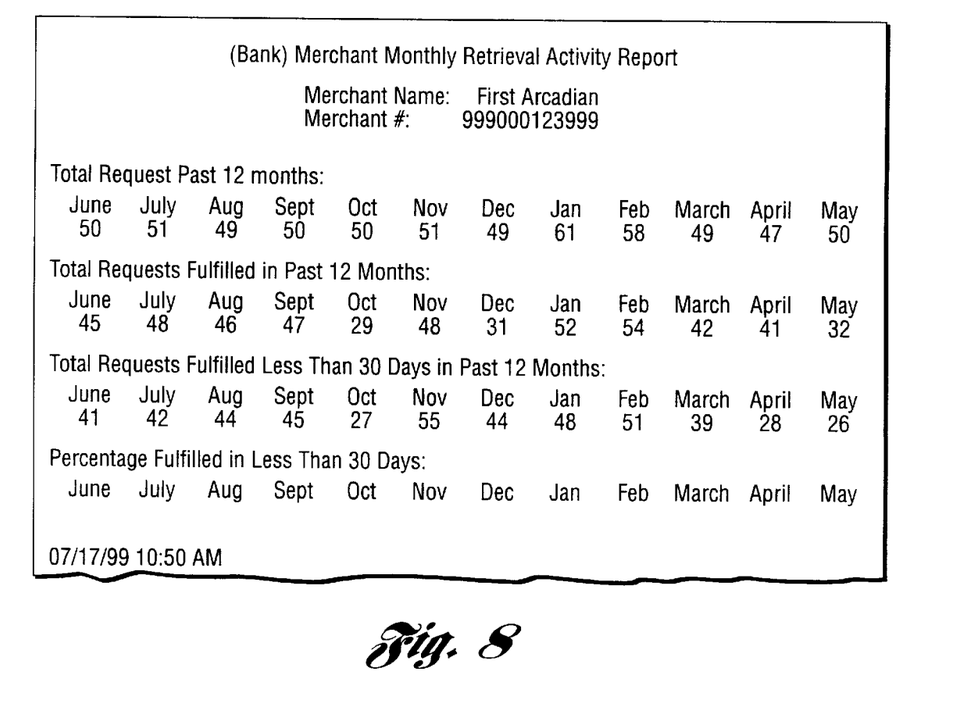
FIG. 8 shows a sample chargebacks/retrievals monthly retrieval activity report.

The chargeback activity summary report provides aging summary for all open chargebacks. The chargeback aging by reasons code report provides information regarding chargeback aging by logical association reason code groupings. The monthly chargeback summary report provides information regarding chargebacks as a percentage of sale for the previous month's activity The monthly retrieval activity report provides retrieval information including total requests during the last twelve months, the total request fulfilled during the last twelve months, the total requests fulfilled in less than thirty days during the last twelve months, and the percentage fulfilled in less than thirty days. FIG. 8 shows a sample monthly retrieval activity report displayed on client station 16 when the user clicks Monthly Retrieval Activity hyperlink 136.

Figure 9:
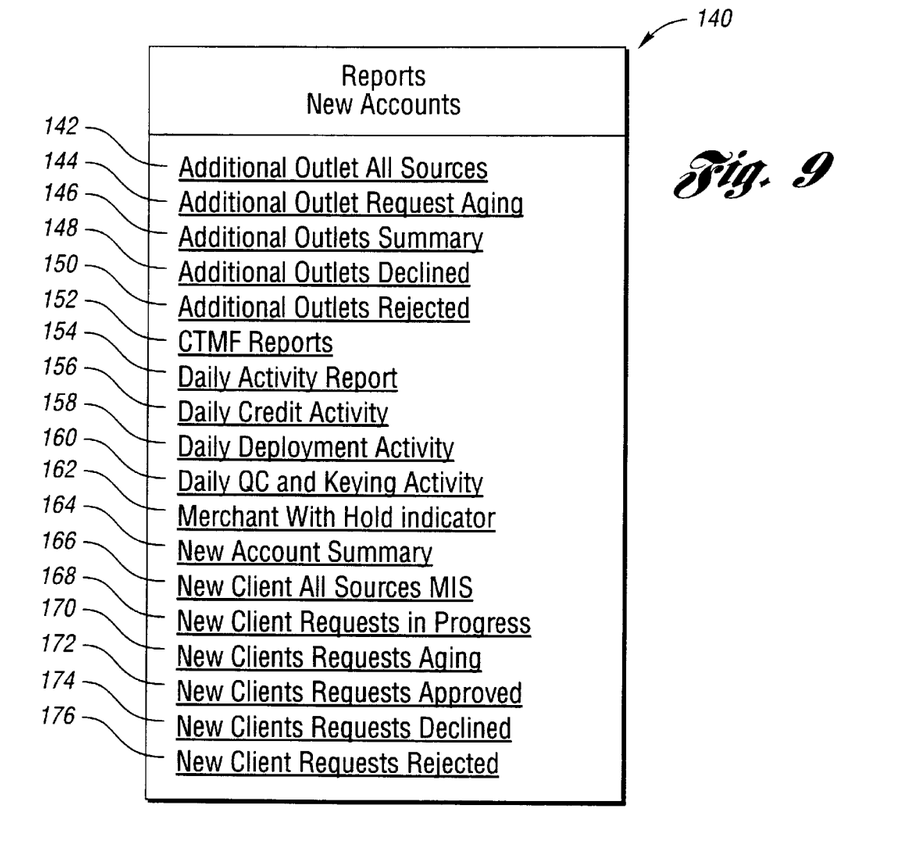
FIG. 9 illustrates a New Accounts WWW page displayed when the user selects the new accounts hyperlink of the WWW page shown in FIG. 3.

Referring now to FIG. 9, a WWW page 140 is displayed on client station 16 when user clicks New Accounts 54 hyperlink. WWW page 140 includes the following hyperlinks to reports corresponding to the new accounts category: Additional Outlet All Sources 142, Additional Outlet Requests Aging 144, Additional Outlets Summary 146, Additional Outlets Declined 148, Additional Outlets Rejected 150, CTMF Reports 152, Daily Activity Report 154, Daily Credit Activity 156, Daily Deployment Activity 158, Daily QC and Keying Activity 160, Merchant with Hold Indicator 162, New Account Summary 164, New Client All Sources MIS 166, New Client Requests in Progress 168, New Client Requests Aging 170, New Client Requests Approved 172, New Client Requests Declined 174, and New Client Requests Rejected 176.

The additional outlet all sources report provides information for total number of accounts and sales volume by unit. This includes data for applications previously held over, input into credit, completed and currently held over. Month to date and year to date data are also provided.

The additional outlet requests aging report provides information regarding total number of additional outlets and sales volume by functional unit (all credit, data entry, investigation, analysis, office review, and sales) and number of days pending. This report includes totals by functional group.

The additional outlets summary report provides details regarding time required to complete key tasks in the additional outlet application process, percentage of applications meeting service level agreements, and average number of days to complete each task. This report includes total number of new and rejected applications and the percentage rejected at any step during the process.

The additional outlets approved report provides a listing of account number, legal name, doing business as, business address, sales volume, risk and credit officer for additional outlet requests approved that day. The totals are provided for the number of additional outlets, sales volume, and risk.

The additional outlets declined report provides a listing of account number, legal name, doing business as, business address, sales volume, risk and credit officer for additional outlet requests declined that day. The totals are provided for the number of accounts, sales volume, and risk.

The additional outlets rejected report provides a listing of account number, legal name, doing business as, business address, sales volume, risk and credit officer for additional outlet requests rejected that day. The totals are provided for the number of accounts, sales volume, and risk.

The CTMF report provides terminated merchant file matches for accounts that are not approved by a reporting agency and are keyed into traces after being credit approved by the user.

The daily activity report provides information regarding the processing of a merchant application from signing through the date of the first deposit. This report includes keying and credit activities, release of equipment, and merchant training. The time to complete key tasks is also calculated.

Figure 10:
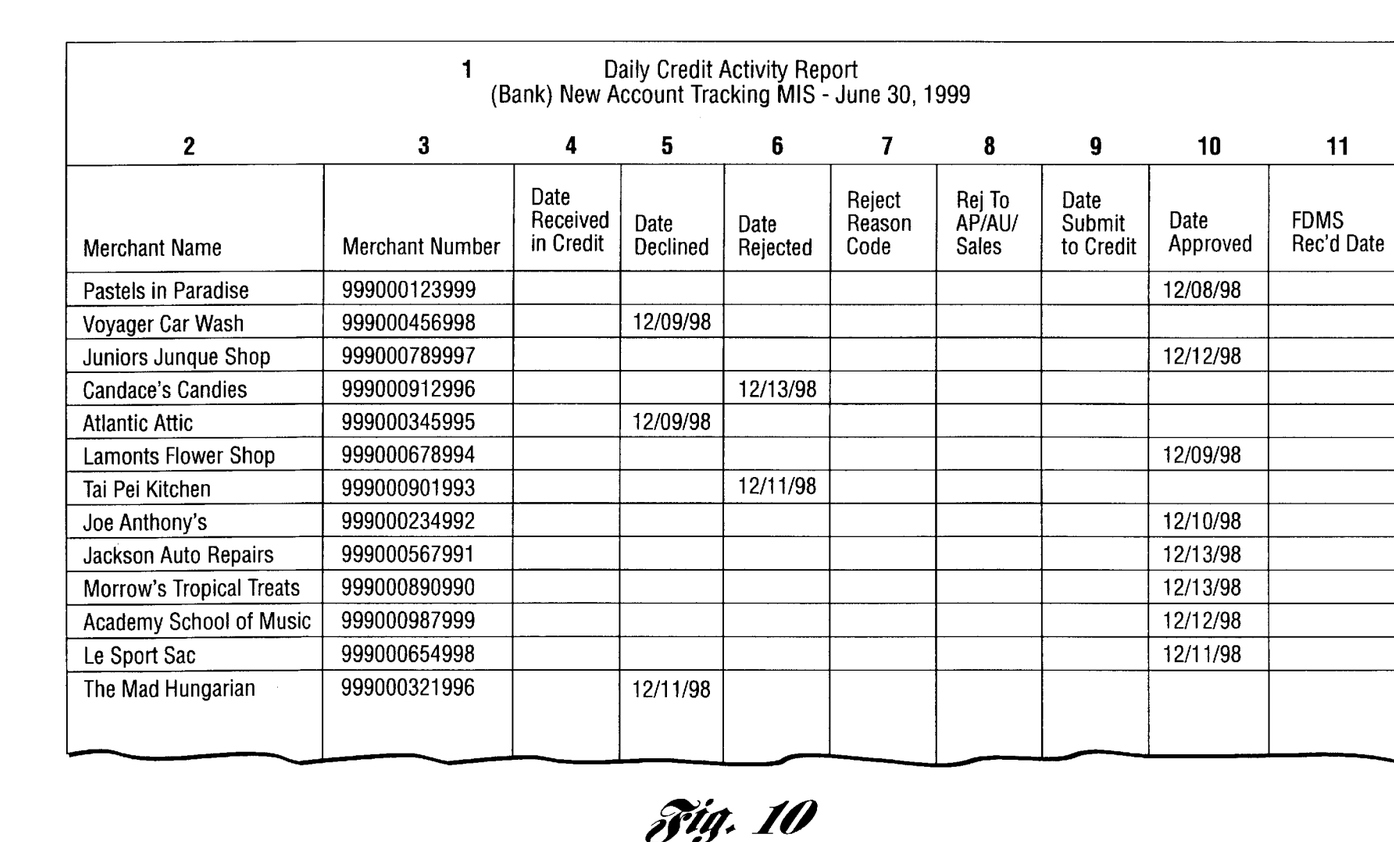
FIG. 10 shows a sample new accounts daily credit activity report.

The daily credit activity report provides information regarding the client determination process for each application. This report includes the date the application is received in credit through the approval/decline/reject date is recorded. This report includes the reject or decline reason. The data is available for the current and prior two months. FIG. 10 shows a sample daily credit activity report.

The daily deployment activity report provides information regarding deployment of equipment, the date the equipment is prepared and shipped, and the date the merchant is trained is recorded. The time to complete key milestones is calculated and the average time for each is displayed.

The daily QC and keying activity report provides information regarding initial entry of the application into the host 12. Details about initial review, and keying of application and rejects are maintained. The time to complete key milestones is calculated and the average time for each is displayed.

The merchant with hold indicator report provides a listing of accounts that are unable to be status on host 12 because critical data is missing. This report includes the account number, type, legal name, salesperson ID, source code, age (days in credit), and reason for hold. The total number of merchants on hold is provided.

The new account summary report provides details regarding time required to complete key tasks in the application process, percentage of applications meeting service level agreements, and average number of days to complete each task. The total number of new and rejected applications and the percentage age rejected at any step during processing is provided.

The new client all sources MIS report provides information for total number of accounts and sale volume by unit. This report includes data for applications previously held over, input into credit, completed and currently held over. Month to date and year to date data are also provided.

The new client requests in progress report provides information regarding accounts that are in process including rejects and non-concurred upon declines. This report includes address, account number, key date, total days in progress, days in sales, legal names, sales risk, SIC, number of outlets and sales ID/source code.

The new client requests aging report provides information regarding total number of new accounts and sales volume by functional unit (all credit data entry, investigation, analysis, office review, and sales) and number of days pending. This report includes totals by functional group.

The new client requests approved report provides a listing of account number, legal name, doing business as, business address, sales volume, risk, and credit officer for accounts approved that day. The totals are provided for number of accounts, sales volume, and risk.

Figure 11:
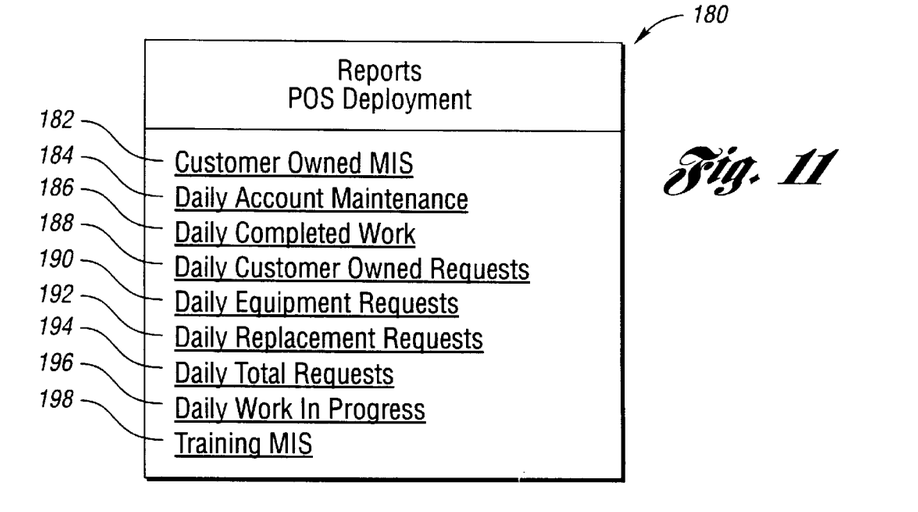
FIG. 11 illustrates a POS Deployment WWW page displayed when the user selects the POS deployment hyperlink of the WWW page shown in FIG. 3.

Referring now to FIG. 11, a WWW page 180 is displayed on client station 16 when user clicks POS Deployment 56 hyperlink. WWW page 140 includes the following hyperlinks to reports corresponding to the POS deployment category: Customer Owned MIS 182, Daily Account Maintenance 184, Daily Completed Work 186, Daily Customer Owned Requests 188, Daily Equipment Requests 190, Daily Replacement Requests 192, Daily Total Requests 194, Daily Work In Progress 196, and Training MIS 198.

The customer owned MIS report provides status of requests for downloads of customer owned terminal equipment. The report consists of a snapshot of the requests as they move through the process. The report includes shipped items by age, items waiting download, waiting scheduling, and called once. The report includes final download.

The daily account maintenance report provides a listing of account maintenance requests. The information provided includes merchant number, DBA name, network, request type, status, and number of business days from request.

The daily completed work report provides a listing of completed point of sale deployments. The report includes merchant number, DBA name, network, request type, status, and number of business days from request.

The daily customer owned requests report provides status of new requests for deployment of customer owned equipment packets. The report consists of a snapshot of requests as they move through the deployment process. The report includes credit approved items by age, pended, rejected, and waiting items.

The daily equipment requests report provides status of new requests for deployment of new equipment. The report consists of a snapshot of requests as they move through the deployment process. The report includes credit approved items by age, pended, rejected, AMEX pended, and waiting items.

The daily replacement requests report provides status of new requests for deployment of replacement equipment. The report consists of a snap-shot of requests as they move through the deployment process. The report includes credit approved items by age, pended, rejected, AMEX pended, and waiting items.

The daily total requests report provides a listing of all new and replacement equipment requests. The report consists of a summary of the daily account maintenance, daily customer owned, daily equipment, and daily replacement report.

Figure 12:
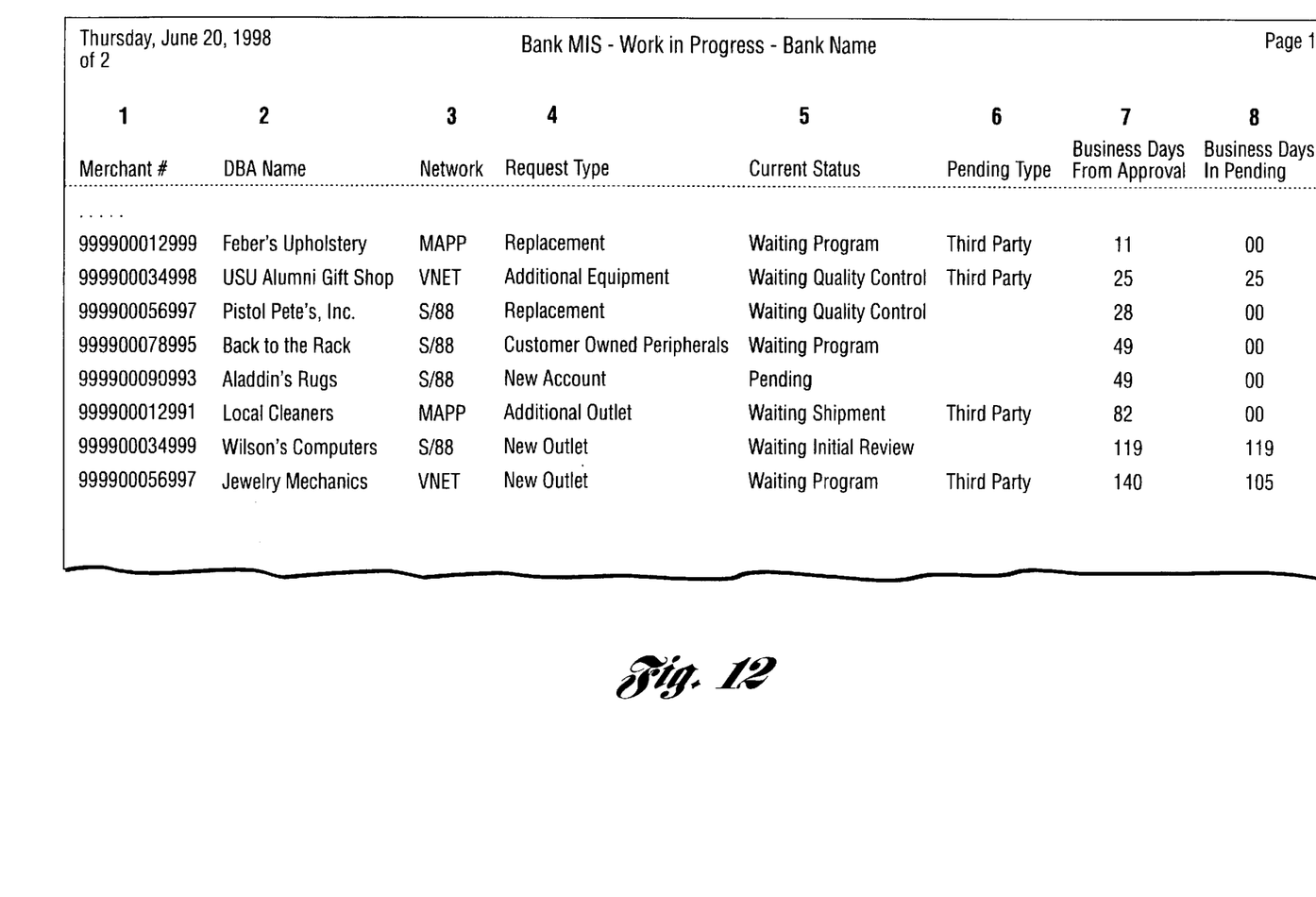
FIG. 12 shows a sample POS deployment work in progress report.

The daily work in progress report provides a listing of point of sale deployment work in process. The report includes merchant number, DBA name, network, request type, status, and number of business days from request. FIG. 12 shows a sample daily work in progress report.

The training MIS report provides a status of requests for merchant training. The report consists of a snapshot of the requests as they move through the process. The report includes shipped items by age, items waiting download, waiting scheduling, and called once. The report includes the final trained status.

Figure 13:
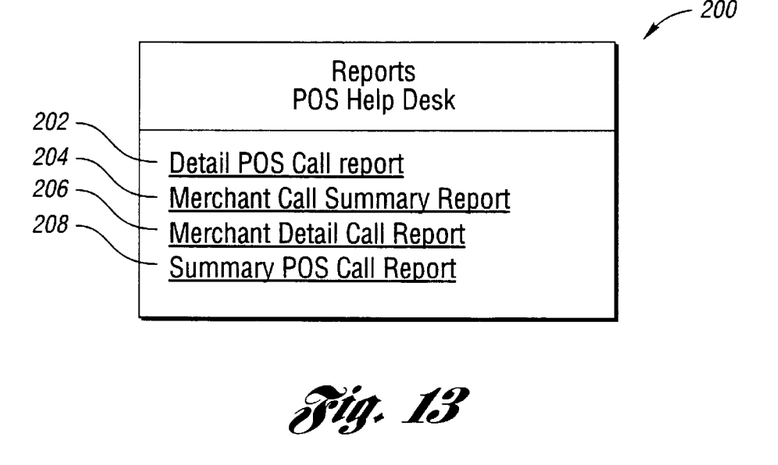
FIG. 13 illustrates a POS Help Desk WWW page displayed when the user selects the POS help desk hyperlink of the WWW page shown in FIG. 3.

Referring now to FIG. 13, a WWW page 200 is displayed on client station 16 when user clicks POS Help Desk 58 hyperlink. WWW page 200 includes the following hyperlinks to reports corresponding to the POS help desk category: Detail POS Call Report 202, Merchant Call Summary Report 204, Merchant Detail Call Report 206, and Summary POS call report 208.

Figure 14:
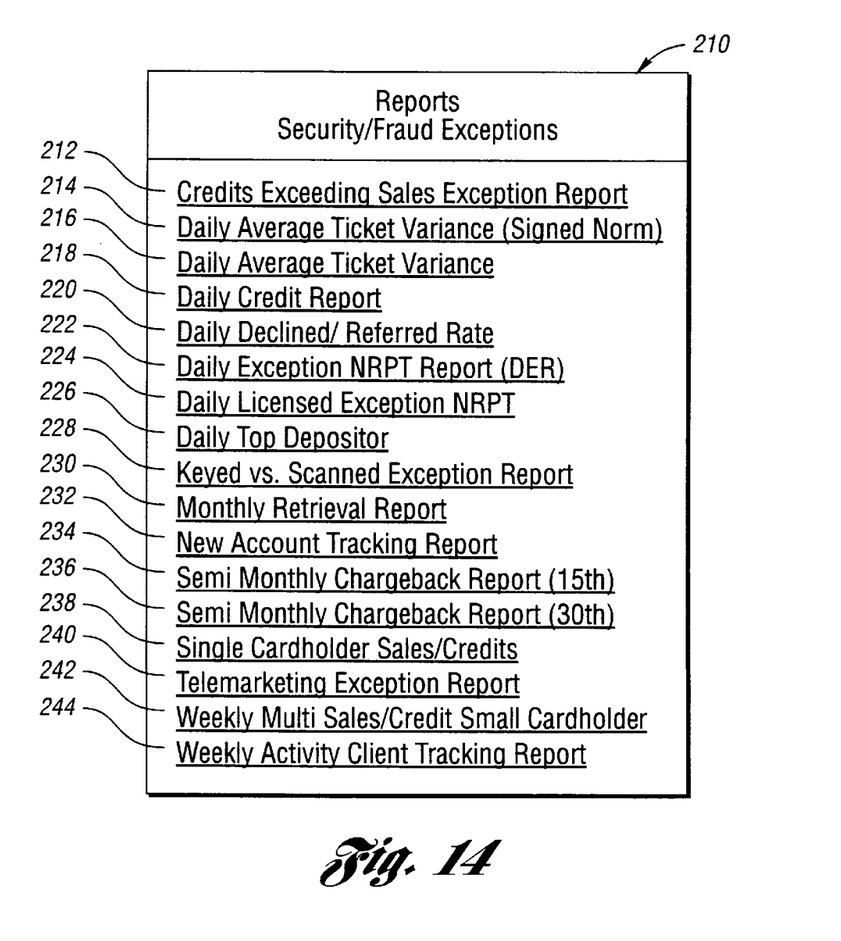
FIG. 14 illustrates a Security/Fraud Exceptions WWW page displayed when the user selects the security/fraud exceptions hyperlink of the WWW page shown in FIG. 3.

Referring now to FIG. 14, a WWW page 210 is displayed on client station 16 when user clicks Security/Fraud Exceptions 62 hyperlink. WWW page 210 includes the following hyperlinks to reports corresponding to the security/fraud exceptions category: Credits Exceeding Sales Exception Report 212, Daily Average Ticket Variance (Signed Norm) 214, Daily Average Ticket Variance-2 216, Daily Credit Report 218, Daily Declined/Referred Rate 220, Daily Exception NRPT Report (DER) 222, Daily Licensed Exception NRPT 224, Daily Top Depositor 226, Keyed vs. Scanned Exception report 228, Monthly Retrieval report 230, New Account Tracking report 232, Semi Monthly Chargeback report (15th) 234, Semi Monthly Chargeback report (30th) 236, Single Cardholder Sales/Credits 238, Telemarketing Exception report 240, Weekly Multi Sales/Credit Small Cardholder 242, and Weekly Activity Client Tracking report 244.

The credits exceeding sales exception report highlights all merchants whose dollar amount of credits on any given day exceeds the amount of sales for that day by a given amount and percentage. Excessive credits create immediate risks and need to be investigated immediately.

The daily average ticket variance (signed norm) report is for newly signed/depositing merchants. This report highlights those merchants whose actual average ticket variance exceeds their signed average ticket by a predefined percentage.

The daily average ticket variance-2 provides a listing of merchants who have average ticket variances. It provides a comparison of the merchant's three month average ticket to the daily average ticket and annual signed sales to actual activity. Merchants listed should be reviewed for invalid sales, factoring, etc.

The daily credit report calculates a merchant's credit ratio (credits divided into sales) and highlights those which are considered to be excessive.

The daily declined/referred rate provides a listing of merchants whose daily declined or daily referral rate/pickup authorization exceed certain parameters. It identifies merchants who are fishing for credit or credit lines, or have obtained lost or stolen credit cards.

The daily exception NRPT report (DER) highlights all merchants whose net revenue per transaction (total discounts less interchange divided by number of transactions) exceeds a specified dollar parameter. The report is segmented by length on board and is used to highlight unusually high average tickets.

The daily licensed exception NRPT report is similar to the daily exception report except that only licensed product volume is considered for inclusion in the report.

Figure 15:
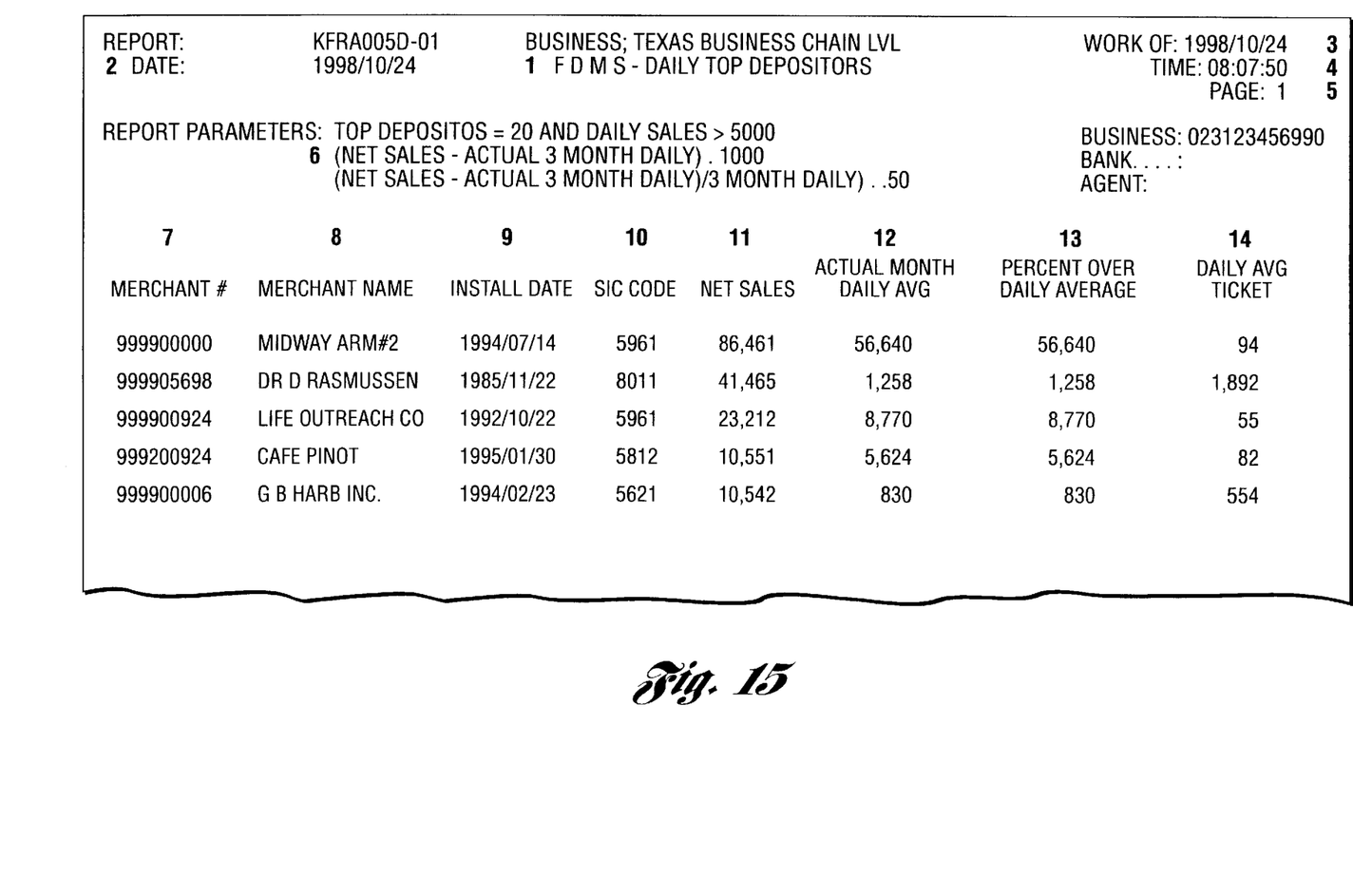
FIG. 15 shows a sample security/fraud exceptions daily top depositor report.

The daily top depositor report is used to identify the largest merchant depositors in a given day with a user portfolio. It identifies merchants whose volume is significantly higher than expected when compared to the entire depositing portfolio under review. FIG. 15 shows a sample daily top depositor report.

The keyed vs. scanned exception report pertains only to those merchants who process electronically and excludes merchants with mo/to category codes (MCC). The report highlights merchants who maintain a POS MCC but are keying (not swiping) an abnormally high percentage of their transactions. This report identifies unauthorized mo/to merchants.

The monthly retrieval report identifies merchants with a large percentage of retrievals. Merchants who appear in this report are considered highly suspect as their customers appear unfamiliar with the transactions for which they are billed and need the media in order to validate the transaction.

The new account tracking report is segmented into three components depending upon how long the merchant has been on the base. This report will highlight merchants whose actual sales volume for a period exceeds expectations for that period.

The semi monthly chargeback report (15th) calculates a merchant's chargeback ratio (chargebacks divided into sales) and highlights those which are considered to be excessive. This report is run on the 15th of each month. The semi monthly chargeback report (30th) is similar, but is run on the 30th of each month.

The single cardholders sales/credits report highlights any and all single cardholder transactions (sales or credits) which exceed a predefined amount. The report is used to identify kiting scenarios.

The telemarketing exception report highlights all merchants who have an abnormally high percentage of recurring dollar transactions. The report is segmented by length on board and highlights telemarketing and/or factoring fraud events.

The weekly multi sales/credit small cardholder report is used in combination with the single cardholder sales/credits transaction exception report. This weekly report looks at cardholder activity over a rolling seven day period and identifies those cardholders whose volume is more than transaction for that period. The report identifies merchants who are kiting but in smaller amounts over long periods of time.

The weekly activity client tracking report identifies merchants whose current weekly activity for a variety of indicators (sales volume, credit ratio, C/B ratio, etc.) exceeds the prior weekly normal averages (90 day rolling average) by predefined parameters.

Figure 16:
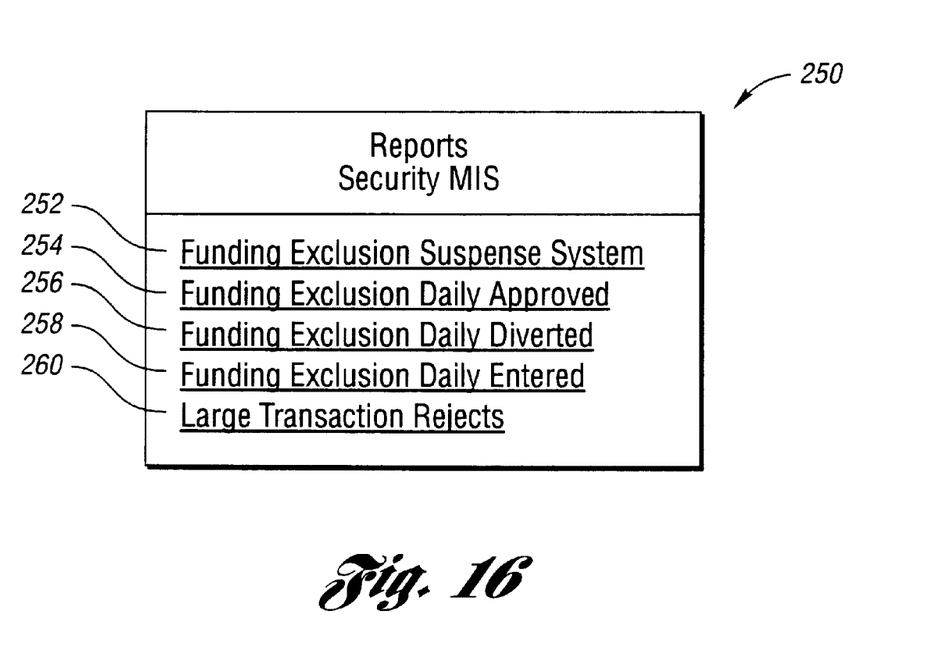
FIG. 16 illustrates a security MIS WWW page displayed when the user selects the security MIS hyperlink of the WWW page shown in FIG. 3.

Referring now to FIG. 16, a WWW page 250 is displayed on client station 16 when user clicks Security MIS 63 hyperlink. WWW page 250 includes the following hyperlinks to reports corresponding to the security MIS category: Funding Exclusion Suspense System 252, Funding Exclusion Daily Approved 254, Funding Exclusion Daily Entered 256, Funding Exclusion Daily Pending 258, and Large Transaction Rejects 260.

The funding exclusion suspense system report is generated from the funding exclusion service suspense system and lists all merchants whose funds of their prior days batches were automatically diverted to form a collateral reserve. Accounts set to auto divert bypass the suspense feature automatically divert. This report is useful for the most problematic of accounts.

The funding exclusion daily approved report is generated from the funding exclusion suspense system. This report lists all merchants whose funds were previously in suspense but were approved (released) the prior day.

The funding exclusion daily diverted report is generated from the funding exclusion suspense system. This report lists all merchants whose funds just entered suspense as a result of their prior days batches exceeding their predefined daily or monthly thresholds.

The funding exclusion daily pending report is generated from the funding exclusion suspense system. This report list all merchants who have funds being held in suspense. This report includes both new and old accounts.

The large transaction rejects report displays all transactions that have exceeded a specific card limit.

Figure 17:
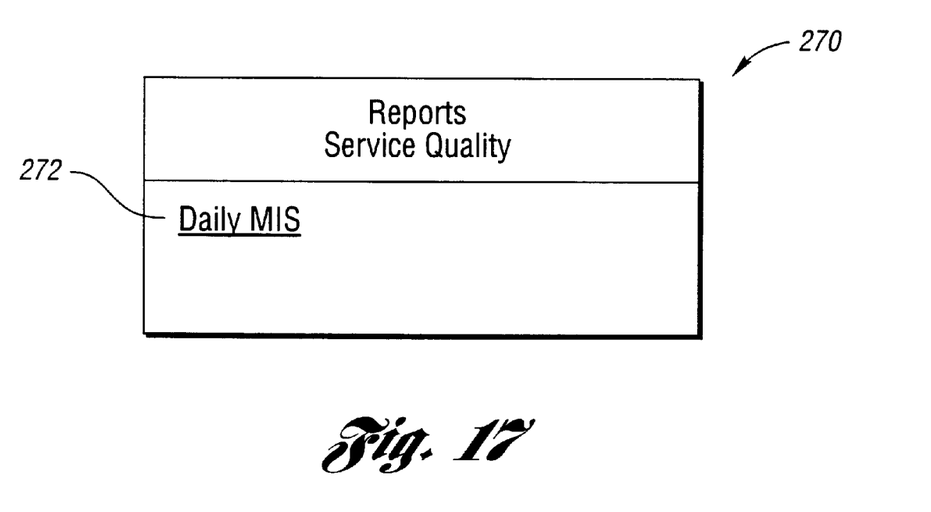
FIG. 17 illustrates a service quality WWW page displayed when the user selects the service quality report.

Referring now to FIG. 17, a WWW page 270 is displayed on client station 16 when user clicks Service Quality 64 hyperlink. WWW page 270 includes the following hyperlinks to report corresponding to the service quality category: Daily Mis 272.

The daily MIS report provides daily and month to date information on selected service level achievements.

Thus it is apparent that there has been provided, in accordance with the present invention, a method of reporting merchant information to banks via the World Wide Web that fully satisfies the objects, aims, and advantages set forth above. Of course, other reports may be added such as reports corresponding to collections.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of reporting merchant information to banks via the World Wide Web, the method comprising:

compiling merchant information periodically into reports at a host operable with the World Wide Web, wherein the reports correspond to categories regarding the finances of merchants, the categories including an account management category, an agent bank profitability category, an audit log category, a chargeback/retrieval category, a new accounts category, and a security/fraud exceptions category, the account management category including a daily cash position report, the agent bank profitability category including an excessive chargeback ratio report, the audit log category including a bank entitlement audit log report, the chargeback/retrieval category including a chargeback activity summary report, and the security/fraud exceptions category including a credit exceeding sales exception report;

routing the reports from the host to a server operable with the World Wide Web;

browsing the World Wide Web with a browser interface at a bank client station operable with the server via the World Wide Web to access the reports of merchants associated with a bank;

determining the reports of the merchants associated with the bank at the server;

determining an access level of the bank at the server;

displaying a list of categories for the merchants associated with the bank on the bank client station, wherein the list of categories for the merchants associated with the bank are displayed as a function of the access level of the bank;

selecting a desired category from the list of categories displayed at the bank client station;

displaying a list of reports corresponding to the desired category on the bank client station;

selecting a desired report from the list of reports at the bank client station; and displaying the desired report on the bank client station.

* * * * *